Patented July 23, 1940

2,208,934

UNITED STATES PATENT OFFICE 2,208,934

MANUFACTURE OF TRIMETHYLENE TRI-NITRAMINE (HEXOGEN)

Josef Meissner, Cologne-Bayenthal, Germany

No Drawing. Application August 9, 1939, Serial No. 289,271. In Germany May 23, 1938

3 Claims. (Cl. 260—248)

This invention relates to improvements in the manufacture of trimethylene trinitramine (hexogen).

The commercial application of hexogen

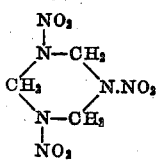

which is generally recognised at the present time as an explosive, is still rendered difficult by the uneconomical use of acid in its manufacture. Normally in the nitrations a batch ratio of 1 part hexamethylene tetramine to 10 parts of nitric acid is employed. Such a batch ratio renders it necessary to work up the residual acids since otherwise the economy of the process is rendered questionable. This specified batch ratio of 1:10 must be maintained in all circumstances in the direct nitration of hexamethylenetetramine in order to obtain a good yield and it is not possible by reduction of the batch ratio to arrive at a more favourable economy of acid.

In the nitration the hexogen remains completely dissolved in the spent acid and this must, in order that all hexogen is precipitated, be treated with water. Hitherto the acid had to be diluted to such an extent with water that a residual acid of about 20% $HNO_3$ remained which still contained a few per cent of hexogen in solution. This strong dilution was necessary because a stronger cncentration of the spent acid excluded the possibility of storing the same since otherwise after a short time the hexogen decomposed. The working up of this 20% waste acid produced was on the one hand not economic and on the other hand incapable of execution. In fact the dissolved hexogen could not be completely precipitated even by still further dilution and thus formed in the denitration column a considerable source of danger.

According to the present invention the nitration mixture (spent acid with dissolved hexogen) should not as hitherto customary be diluted to 15–20% $HNO_3$, but it is sufficient for the practically complete precipitation of the hexogen to dilute the spent acid only to 40–60% $HNO_3$. This spent acid contains about the same quantity of hexogen dissolved as the 20% spent acid.

According to a further feature of the invention by immediate introdutcion of the 40–60% spent acid into sulphuric acid of not too low concentration, for example into an acid of 80–95% $H_2SO_4$, the hexogen is completely destroyed and by this means an acid stable to storing produced which on account of the high $HNO_3$ content is immediately capable of denitration or concentration.

In the process of mixing it is possible to proceed in such a manner that either the waste acid is gradually introduced into sulphuric acid, or the waste acid so combined with sulphuric acid that the two liquids in corresponding proportions by weight are continuously allowed to flow together. In this operation the temperature of the sulphuric acid or of the mixture is maintained between 30° and 80° C.

The proportion of waste acid to sulphuric acid is on the one hand determined by the requirement of the complete decomposition of the hexogen, on the other hand by the requirement of the economic working up of the acid. It has been found that proportions which lie between 1:1.5 to 1:7 correspond best to these two requirements.

I claim:

1. Process for the working up of the nitration mixture produced in the manufacture of trimethylene trinitramine (hexogen), wherein from the concentrated nitric acid used for the reaction, by dilution with water to a content of 40–60% $HNO_3$ the hexogen is precipitated and the separated residual acid immediately brought together with 1–7 times the quantity of concentrated sulphuric acid, temperatures between 30 and 80° C. being maintained.

2. Process as claimed in claim 1 in which the acid mixture is subsequently denitrated.

3. Process as claimed in claim 1 in which the acid mixture is subsequently concentrated.

JOSEF MEISSNER.